April 23, 1963  F. A. LUDEWIG, JR  3,087,148
DIGITAL TRANSDUCER SYSTEM
Filed July 30, 1959  7 Sheets-Sheet 1

Inventor
Frederick A. Ludewig, Jr.
by J. David Blumenfeld
His Attorney

April 23, 1963　　　F. A. LUDEWIG, JR　　　3,087,148
DIGITAL TRANSDUCER SYSTEM
Filed July 30, 1959　　　　　　　　　　　　　7 Sheets-Sheet 2

Inventor
Frederick A. Ludewig, Jr.
by J. David Blumenfeld
His Attorney

April 23, 1963   F. A. LUDEWIG, JR   3,087,148
DIGITAL TRANSDUCER SYSTEM
Filed July 30, 1959   7 Sheets-Sheet 3

Inventor
Frederick A. Ludewig, Jr.
by J. David Blumenfeld
His Attorney

April 23, 1963     F. A. LUDEWIG, JR     3,087,148

DIGITAL TRANSDUCER SYSTEM

Filed July 30, 1959     7 Sheets-Sheet 4

Inventor
Frederick A. Ludewig, Jr.,
by J. David Blumenfeld
His Attorney

April 23, 1963    F. A. LUDEWIG, JR    3,087,148
DIGITAL TRANSDUCER SYSTEM
Filed July 30, 1959    7 Sheets-Sheet 5

Inventor
Frederick A. Ludewig, Jr.
by I. David Blumenfeld
His Attorney

April 23, 1963  F. A. LUDEWIG, JR  3,087,148
DIGITAL TRANSDUCER SYSTEM
Filed July 30, 1959  7 Sheets-Sheet 7

Inventor
Frederick A. Ludewig, Jr.
by J. David Blumenfeld
His Attorney

United States Patent Office 3,087,148
Patented Apr. 23, 1963

3,087,148
DIGITAL TRANSDUCER SYSTEM
Frederick A. Ludewig, Jr., Ballston Spa, N.Y., assignor to General Electric Company, a corporation of New York
Filed July 30, 1959, Ser. No. 830,598
19 Claims. (Cl. 340—347)

This invention is related to a transducer assembly, and more particularly, to a transducer for producing a digitally coded output.

A digital output may be defined as an output signal which is a series of discrete voltages in a coded form. As the parameter being sensed varies, the state of a finite number of the voltages changes from one condition to another in such a manner that the value of the sensed parameter is represented in the desired coded form. One typical form of such a digital code is the well known binary code although other digital codes are equally well known.

The application of computers, and particularly digital computers, in measuring and control applications is hindered by the excessive size and complexity of the equipment required to supply the information to the computer in a form compatible with digital computer input requirements. A transducer for measuring the physical parameter is customarily required to supply information to the computer.

Practically all of the transducers available today, however, have low level analog outputs; i.e., output signals or information that vary smoothly as a function of the input. The low level analog signals must first be converted to digital form by an analog to digital converter before the information may be utilized by the computer. Because such a system requires transmission of low level analog signals to the digital converter, these signals are readily degraded by noise and pickup, introducing errors and ambiguities into the system. Furthermore, in addition to being bulky, expensive, and complex, analog to digital converters usually contain voltage reference sources which may introduce additional inaccuracies into the system. In order to avoid all the difficulties, it is desirable to provide a transducer assembly which has a digital output.

To provide such a digital transducer system is one object of the present invention.

A further object of this invention, then, is to provide a transducer having a digital output without requiring an analog to digital converter;

Yet another object of this invention is to provide a digital transducer assembly which is small in size, low in cost, and simple to manufacture;

Still another object of this invention is to provide a transducer which produces an output in binary coded form;

Still another object of this invention is to provide a digital transducer which utilizes a stress sensitive optical material;

Other objects and advantages of the invention will become apparent as a description thereof proceeds.

In accordance with one of its aspects, the invention contemplates utilizing a member of optically transparent, temporary doubly refracting material. This material introduces a phase difference between the ordinary and extraordinary rays, causing a beam of plane polarized light to become elliptically polarized. If the beam subsequently passes through a properly oriented polarizing analyzer, the resulting intensity of the light beam will vary cyclically with the stress applied to the material. The stress sensitive member is so constructed that upon application of load the stress distribution in the member follows a predetermined coded relationship, so that the variations of the light intensities in various portions of the member also follow the desired coded relationship. As a result, an output is produced in response to the light variations which represent the load in the desired coded form.

A number of alternative embodiments are disclosed for producing output signals both in straight binary code and in reflected binary or Gray code. In addition, a number of transducer constructions are disclosed utilizing electrical and magnetic stresses as well as mechanical stresses to produce the desired change in the polarization necessary to produce a digital output.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

In order to comprehend the instant invention fully it will be useful to review the phenomenon of stress sensitivity which is the underlying physical effect upon which the various instrumentalities to be described below are based. Certain materials, of which cellulose nitrate, epoxy resins, and polyurethane rubber are typical examples, exhibit the phenomenon of double refraction when subjected to stress so that plane polarized light in passing through such a material becomes elliptically polarized. What actually takes place in the material is that the incident plane polarized light is resolved into two separate components polarized at right angles to each other. These travel through the material at different velocities producing a relative phase difference or retardation between the components thereby generating (in the general case) elliptically polarized light. The amount of retardation varies directly with the stress, the length of the light path through the material, i.e., the thickness, and inversely with the wavelength of the incident polarized light. The phase retardation in radians at any point produced by a given load is $2\pi n$ where $n$ is usually referred to as the fringe order at that point. If the light subsequently passes through a polarizing element, which transmits light components in a given plane of polarization only, the intensity of the light varies cyclically with linearly increasing phase retardation between two levels illustrated at $I_{max}$ and $I_{min}$ on the curve I of FIGURE 1, which shows the transmitted light intensity variations plotted against load, since the phase retardation varies linearly with load.

Figure 1:
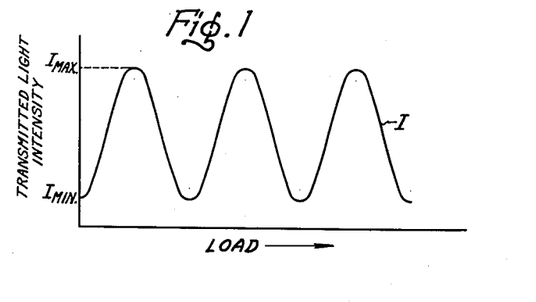
FIGURE 1 is a curve showing the transmission characteristics of a typical stress sensitive material useful in carrying out the invention.

The variations in light intensity, exemplified by the curve I depend on the stress (i.e., load per unit area). Therefore, for a given load value the stress condition and hence the fringe order is a function of the cross-sectional area normal to the direction of applied load. Thus if a temporary doubly refracting member is constructed with a geometry having a plurality of sections of constant thickness but different cross-sectional areas, the stress distribution and the fringe order relationship in the different sections correspond to the ratio of the cross-sectional areas. Thus if the member is constructed so that the areas of the various sections bear the relationship $$1:2:4:8: \ldots 2^n$$

where $n=0, 1, 2, 3, \ldots$ etc., the stresses in the respective sections for any given load vary inversely with cross-sectional areas.

Now for a given material exhibiting double refraction under stress having a thickness $t$, that load necessary to produce sufficient stress to produce a phase retardation of $\pi$ radians, thus changing the intensity of the polarized light from one level to the other, is defined as the unit load. This unit load divided by the cross-sectional area is then called the unit stress and is also known as the stress-optic coefficient $f$. Thus with a unit load applied to the member, the stress in each section is inversely proportional to the ratios of their cross-sectional areas and hence bears the relationship $1:\frac{1}{2}:\frac{1}{4}:\frac{1}{8} \ldots \frac{1}{2^n}$. Looking at it another way, the load required to cause the various sections to assume the same fringe order $n$ follows the relationship $1:2:4: \ldots 2^n$. This can be seen from the following equation for determining fringe order:

$$n = \frac{Pt}{Af}$$

where $n$ = the fringe order at any point (i.e., phase retardation in $\gamma$)
$P$ = the load
$t$ = thickness
$A$ = the area of the section
$f$ = the stress-optic coefficient or unit stress for a given material It can be appreciated that for a given material of stress optic coefficient $f$ having a number of sections of cross-sectional areas related in the ratio $1:2:4:8 \ldots 2^n$, the load $P$ required to cause each section to have the same value of fringe order also varies as the ratio $$1:2:4:8: \ldots 2^n$$

It follows then that the cyclic recurrence rate of the light intensity variations in the sections, which are a function of the amount of phase retardation, vary in a corresponding manner.

If the stress sensitive member is placed in a beam of polarized light which passes through the individual sections, and the light output from each section is passed through a second polarizing element and onto a separate detector, the output of the individual detectors varies as the load is increased in the manner shown in the following tabulation in which the state of the detector is noted by a zero (0) for a minimum light level and output, and is denoted by a one (1) for maximum light level and output.

| Per unit load | Detector D (area=8) | Detector C (area=4) | Detector B (area=2) | Detector A (area=1) |
|---|---|---|---|---|
| 0 | 0 | 0 | 0 | 0 |
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 0 | 1 | 1 | 1 |
| 6 | 0 | 1 | 0 | 1 |
| 7 | 0 | 1 | 0 | 0 |
| 8 | 1 | 1 | 0 | 0 |
| 9 | 1 | 1 | 0 | 1 |
| 10 | 1 | 1 | 1 | 1 |
| 11 | 1 | 1 | 1 | 0 |
| 12 | 1 | 0 | 1 | 0 |
| 13 | 1 | 0 | 1 | 1 |
| 14 | 1 | 0 | 0 | 1 |
| 15 | 1 | 0 | 0 | 0 |

Comparing this tabulation of the detector conditions with a representation of the numbers 1-15 in a form of binary code known as the reflected binary or Gray code as tabulated below:

| Decimal code | Gray code (reflected binary code) | Decimal code | Gray code (reflected binary code) |
|---|---|---|---|
| 0 | 0000 | 8 | 1100 |
| 1 | 0001 | 9 | 1101 |
| 2 | 0011 | 10 | 1111 |
| 3 | 0010 | 11 | 1110 |
| 4 | 0110 | 12 | 1010 |
| 5 | 0111 | 13 | 1011 |
| 6 | 0101 | 14 | 1001 |
| 7 | 0100 | 15 | 1000 | it can be seen that the state of each detector is a representation of the per unit load in terms of a binary code and it therefore follows that a force sensor and transducer having a binary coded output may be constructed utilizing such a temporarily doubly refracting material.

Figure 2:
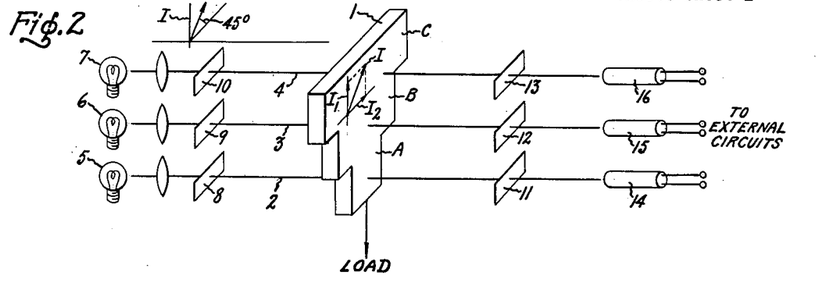
FIGURE 2 is a schematic illustration of a digital transducer assembly for producing a reflected binary or Gray code output.

Such a transducer construction embodying the invention is illustrated in FIGURE 2 and includes a cyclic stress sensitive doubly refracting member 1 which, when stressed by application of a load F, produces a phase retardation between the rectangular wave component of an incident beam of polarized light which is proportional to the load and results in a rotation of the plane of polarization. The member 1 is constructed to have a stepped geometry including plurality of sections A, B, and C of constant thickness and cross-sectional areas related by the factors $1:2:4: \ldots 2^n$. Plane polarized light beams 2, 3, and 4 pass through sections A, B, and C and a phase retardation is introduced in response to and by an amount which is proportional to the stress producing load F.

The polarized light beams 2, 3, and 4 are produced by an optical system in which beams of natural or unpolarized white light from incandescent light sources 5, 6 and 7 are projected through a suitable optical system onto the combination narrow wavelength band pass filter and polarizing elements 8, 9 and 10 which convert the unpolarized white light into relatively monochromatic, plane polarized light. The filter polarizers 8, 9 and 10, shown as an integral member in actuality comprise two separate components one of which filters the white light transmitting only a single wavelength or a narrow band of wavelengths to form a beam of relatively monochromatic light. The monochromatic light enters a polarizer element in which the unpolarized light is resolved into two plane polarized beams at right angles to each other which are propagated along the principal planes of the polarizer. The polarizer, however, is characterized by selective absorption or dichroism and one of the beams is absorbed so that the beam emerging from the polarizer is plane polarized. One such dichroic material is a crystalline substance known as Heraphathite which is sold in commercial form by the Polaroid Corporation under the trade name Polaroid. It will be understood, however, that other polarizing elements such as Nichols, Glan-Thomson or Ahrens prisms may be used instead of the Polaroid.

By rotating the polarizer to manipulate the position of its principal optical planes in space, the plane of polarization of the light beam is correspondingly positioned in space. The polarizing elements 8, 9 and 10 have their principal optical planes so positioned that the plane of polarization of the light beam is at +45° to the direction of stress, as illustrated by the vector I, and the polarizers will hereafter be denominated as +45° polarizers. The plane polarized light beams in traversing the stress sensitive member 1 are resolved into two equal rectangular components $I_1$ and $I_2$ which are propagated through the member in directions parallel to the principal stresses. Any stresses in the member 1 cause the two wave components to travel along the planes of principal stress at different velocities introducing a phase difference, or relative retardation, which as the two wave components recombine upon leaving the member 1, produces elliptically polarized light.

The light beams after passing through the member 1 are projected through polarizing elements 11, 12 and 13 onto individual photoelectric detector elements 14, 15 and 16 to produce electrical outputs in response to the light intensity. The polarizing elements 11, 12 and 13 are usually denominated as analyzers to distinguish them from the polarizing elements 8, 9 and 10 and to describe their function. That is, the analyzers 11, 12 and 13 are so positioned in space that their principal optical planes and axes are at right angles, or crossed, to those of the polarizers 8, 9 and 10 so that the analyzers transmit only light vibrations in a plane oriented at 90° in space relative to the vibrations emerging from the polarizer. Consequently, the analyzers 11, 12 and 13 may be referred to as −45° analyzers to indicate the angular relationship of their principal optical planes to those of the polarizers 8, 9 and 10.

Figure 3:
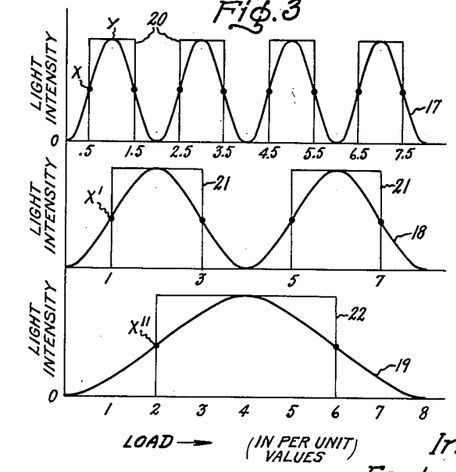
FIGURE 3 shows the transmission characteristic curves of the particular stress sensitive member shown in the transducer of FIGURE 2.

The curves of FIGURE 3 of the drawings show both the transmission characteristics of the sections A, B, and C and the output of the detectors as a function of applied load and are useful in understanding the operation of the digital transducer of FIGURE 2. The curve 17 represents the transmission characteristic of section A, and the output of detector 14, the curve 18 that of section B and detector 15, and curve 19 that of section C and detector 16. Thus with no load applied to the member 1 the light beams 2, 3, and 4 having a polarization illustration by the vector I are transmitted without any phase retardation and are completely blocked by the analyzers 11, 12, and 13 and the light intensity level on the detectors is at the minimum so that their outputs are essentially zero.

As load is applied to the member, section A is stressed causing the perpendicular wave components of the polarized light to travel at different velocities, introducing a phase shift α proportional to the stress. This phase shift affects the polarization characteristics of the light beam in the manner shown in FIGURE 20. For phase shifts α of less than π/2 radians the light beam polarization is changed from the +45° plane polarized light to elliptically polarized light having a major axis along the original +45° plane of polarization. The light vector I in traversing the ellipse has a component of varying magnitude along the axis of transmission of the analyzer. The analyzer thus transmits a sinusoidally varying plane polarized component to the detector 16 which has a peak amplitude equal to ½ the projection of the ellipse on the line representing the direction in which the analyzer transmits. The intensity of illumination of a light wave for a given amplitude "a" is a function of the amplitude squared; i.e., $I\alpha \sim a^2$ the intensity of illumination and consequently the magnitude of the electrical output signal from detector 16 is proportional to the square of the amplitude "a" (where a is ½ the projection of the ellipse on the line representing the direction in which the analyzer transmits).

Figures 14, 15, 21, 23:
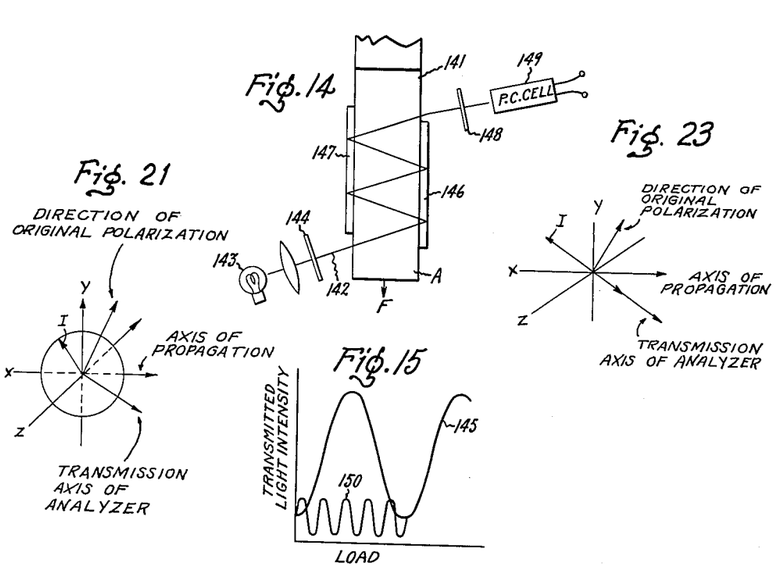
FIGURE 14 is still another embodiment of a digital transducer utilizing a multiple path reflectance system.
FIGURE 15 is an illustration of the transmission characteristic curves of the multiple reflectance system of FIGURE 14.
FIGURE 21 is a plot of the variations in light vector amplitude showing the variation in light amplitude as the phase shift $\alpha$ increases from 0 to $\pi/2$.
FIGURE 23 is a plot of the variations in light vector amplitude as the phase shift $\alpha$ increases further until it reaches a phase retardation $\alpha = \pi$.

As the amount of phase shift α increases from zero (0) to π/2 ($\alpha \leq \pi/2$) the minor axis increases in magnitude and the analyzer 11 transmits increasing amount of light until at α=π/2 the light emerging from the member 1 is circularly polarized as shown in FIGURE 21. The amplitude of the vector $I_{\alpha=\pi/2}$ for circular polarization is equal to .707 of the amplitude "a" of the plane polarized wave I and the intensity of illumination is $(.707)^2$ or ½ the maximum intensity level as shown by the point X on curve 17.

Figures 13, 20, 22:
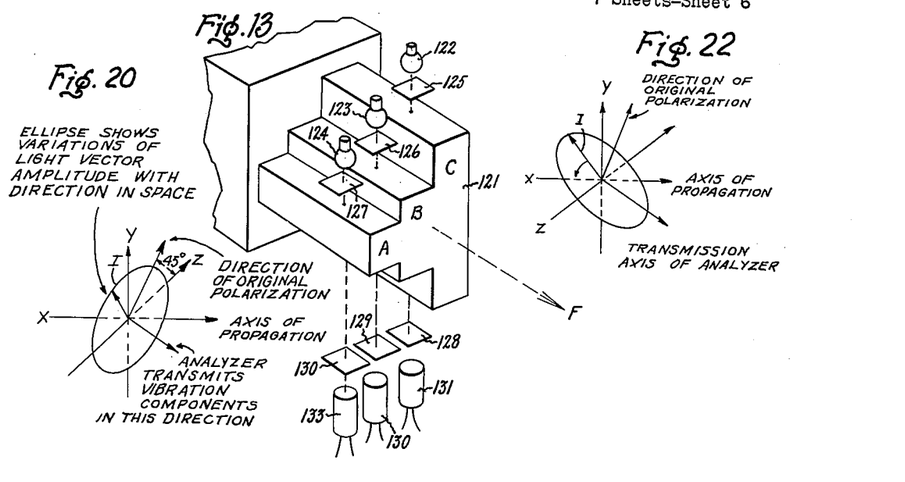
FIGURE 13 is another embodiment of a transducer assembly which utilizes variable length light paths.
FIGURE 20 is a plot of the variations in light vector amplitude which occur in response to a phase shift introduced as a result of an applied stress to the transducer.
FIGURE 22 is a plot of the variations of light vector amplitude as the phase shift $\alpha$ proceeds between the values of $\pi/2$ and $\pi$.

For phase shifts π/2<α<π the polarization of the light emerging from the member 1 is again elliptical but the orientation of the ellipse axes has been shifted by 90° with the major axis along the transmission axes of the analyzers as shown in FIGURE 22. Thus the plane polarized component transmitted by the analyzer 11 increases further until at a phase retardation α=π the light beam is again plane polarized but rotated 90° from the original polarization plane, as shown in FIGURE 23. Consequently, the light beam of original intensity I is transmitted by the analyzer 11 and the intensity of light reaches the maximum level indicated at Y on curve 17.

As the load increases further the amount of phase shift increases, until the light is again plane polarized in the direction of the original polarization and is completely blocked by the analyzer reducing the light intensity and the output from the detector to zero. As the load increases still further the cycle is repeated so that the light intensity level varies cyclically between the two levels with load.

In a similar manner the light beams projected through the sections B and C vary cyclically between two levels of intensity for incremental increases of load. However, the load increment required to vary the light intensity between the two levels is twice (2) as large for section B and four (4) times as large for section C as shown by the curves 18 and 19. It can be seen, therefore, that the cyclic variations of the light intensity levels for the different beams are harmonically related in that their recurrence rates correspond to the ratio of the cross-sectional areas and hence, to the coded binary relationship desired in the output signals.

In order to produce the desired binary output from the cyclic variations of the light intensity between the two levels, it is desirable to convert the sine square light intensity variations illustrated by curves 17, 18 and 19 into digital responses as exemplified by steep wave front pulses for example, so that the output signals change abruptly. Thus, whenever the intensity of the light and hence the output from the detector reaches a predetermined level or value such as is illustrated by the intermediate point X, X' and X'' on the curves 17, 18 and 19, pulsing circuits to be described later with reference to FIGURE 6, connected to the detectors 14, 15 and 16 produce a steep positive pulse front or other similar digital indication. Whenever the light intensity drops below this value the output circuit is de-energized producing a steep negative going wave front or digital indication. Thus for each half cycle of the curves 17, 18 and 19, digital information is produced in the form of pulses 20, 21 and 22. The simultaneous occurrence of any combination of these pulses represents the instantaneous value of the applied load F.

The pulses 20, 21 and 22, as is customary in binary coded systems, represent binary one (1) whereas absence of such a pulse represents binary zero (0). Examining the output of the detectors 14, 15 and 16 with load, the following tabulation is obtained:

| Load increments | Load in per unit load increments | Detector C | Detector B | Detector A |
|---|---|---|---|---|
| 0 | 0 | 0 | 0 | 0 |
| 1 | ½ | 0 | 0 | 1 |
| 2 | 1 | 0 | 1 | 1 |
| 3 | 1½ | 0 | 1 | 0 |
| 4 | 2 | 1 | 1 | 0 |
| 5 | 2½ | 1 | 0 | 0 |
| 6 | 3 | 1 | 0 | 1 |
| 7 | 3½ | 1 | 1 | 1 | which indicates that the load varies in the above manner with changes in absolute load increments equivalent to one half the value of the per unit load. When the above tabulated pulse relationship is compared with various types of binary codes:

| Decimal | Straight binary | Gray code (reflected binary) |
|---|---|---|
| 0 | 000 | 000 |
| 1 | 001 | 001 |
| 2 | 010 | 011 |
| 3 | 011 | 010 |
| 4 | 100 | 110 |
| 5 | 101 | 100 |
| 6 | 110 | 101 |
| 7 | 111 | 111 | it can be seen that the output pulses 20, 21 and 22 of FIGURE 3 represent instantaneous load values in a reflected binary or Gray code. The Gray code when compared to a straight binary code is characterized by the fact that only one digit in the code changes at a time, which, of course, is highly desirable under many circumstances in that it reduces ambiguity to a minimum. Furthermore, it should be noted that a change of pulse state occurs at load increments of one-half (½) of per unit load values which results in increased sensitivity.

The binary output pulses 20, 21 and 22 may then be applied directly to a computer for purposes of various computations, or alternately may produce a visual indication by any one of a number of well known methods.

So far the description of the transducer system of FIGURE 2 has proceeded in terms of force measurement per se. However, it will be immediately apparent to those skilled in the art that many other parameters such as pressure, motion, acceleration, current, voltage, temperature, etc., can readily be converted to a force and measured by means of a transducer system embodying the instant invention. Furthermore, for the sake of simplicity of illustration and description, a stress sensitive optical member geometry has been shown with only three sections. It is apparent, however, that in actual practice the stress sensitive element would contain any number of sections required in order to cover the desired range of forces to be measured.

In the transducer assembly of FIGURE 2 the absolute value of some predetermined light intensity and detector output level illustrated by the points $x$ on the curves 17, 18 and 19 are utilized to produce the pulses 20, 21 and 22. Hence, any variations in emission from the light source, variation in the photosensitive devices with temperature and time, variations in reference voltage in the detector output network will affect the production of the output pulses along with variations in sample loading. Any variable parameter other than load which changes the magnitude of the detector output is of course highly undesirable since this introduces serious ambiguities. Consequently it is highly advantageous to avoid measuring the absolute transmitted light intensity. To this end, if the light emerging from the stress sensitive member is split into two separate beams, and the proper phase shift is introduced between the two beams, then only the variations in the relative intensity of the two light beams is detected and the effects of light source intensity variations, etc., are cancelled out.

Figure 4:
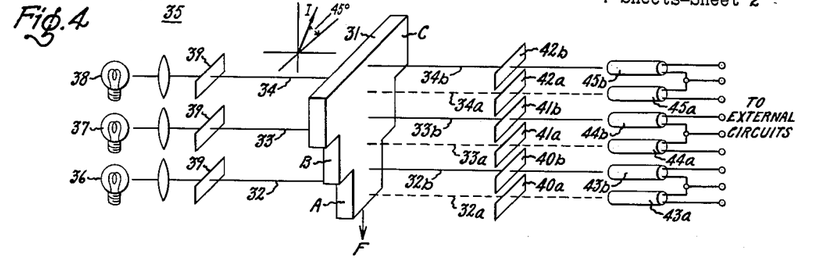
FIGURE 4 is a modification of the digital transducer assembly of FIGURE 2.

FIGURE 4 illustrates such a digital transducing system. Thus as in FIGURE 2, a cyclic, stress sensitive, doubly refracting member 31 is provided for introducing a phase retardation and rotating of the light beam plane of polarization in response to load. The member 31 has a plurality of sections A, B, and C of constant thickness and the areas of which bear the relationship $1:2:4 \ldots 2^n$. The plane polarized light beams 32, 33 and 34 which are projected through the sections A, B, and C are produced by an optical system illustrated generally at 35. Unpolarized white light from the incandescent light sources 36, 37 and 38 is converted by a plurality of identical filtering and polarizing elements 39 into monochromatic plane polarized light beam oriented at +45° in the manner described previously. Each of the light beams emerging from sections A, B, and C of member 31 are split into two beams 32a, 32b, etc., and projected through individual analyzer elements 40a, 40b, 41a, 41b, 42a, and 42b onto corresponding photosensitive detector elements 43a, 43b . . . 45a, 45b, which may be photoconductive so that the resistances thereof vary with light intensity. The principal optical planes of analyzers 40a, 41a, and 42a are positioned at −45° whereas analyzers 40b, 41b, and 42b are oriented at +45°. As a result, the principal planes of analyzers 40a, 41a, 42a and those of polarizers 39 are crossed while the analyzers 40b, 41b, 42b and the polarizers 39 have their principal planes parallel. Consequently, polarizers 40a, 41a, 42a will not pass light polarized as indicated by the vector I whereas the analyzers 40b, 41b, and 42b pass light polarized in the original direction indicated by the vector I. Therefore, the light intensity variations as seen by the detectors associated with the analyzer pairs for each section are 180° out of phase as indicated by the curves of FIGURE 5.

Figure 5:
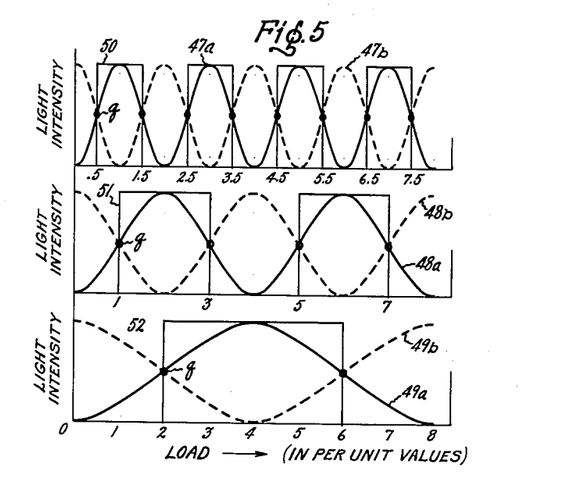
FIGURE 5 shows the transmission characteristic curves of the transducer assembly of FIGURE 4.

The solid curve 47a of FIGURE 5 shows the light intensity variations of the beam 32a while the dashed curve 47b that of the light beam 32b. Similarly the curves 48a, 48b, 49a and 49b represent respectively the variations in light intensity and detector output of the beams 33a, 33b, etc. It can be seen by inspection that with no load on the member 31, beam 32a is completely blocked by the analyzer 40a because of the relative orientation and the principal optical plane of the analyzer of its plane of polarization. The analyzer 40b on the other hand with its principal plane parallel to that of the polarizer 39 transmits all of the polarized light so the light intensity falling on the detector is at a maximum for zero load. Similarly as the load varies these curves and hence the resistance variations of the detectors 43a and 43b are always 180° out of phase. If the photoelectric detector pairs are then connected in bridge circuit, the output circuitry may be arranged to produce the output pulses 50, 51 and 52 whenever the bridge condition is such that the relative magnitudes of the detector resistances is that shown by the points $q$ on the intersection of the curves.

Figure 6:
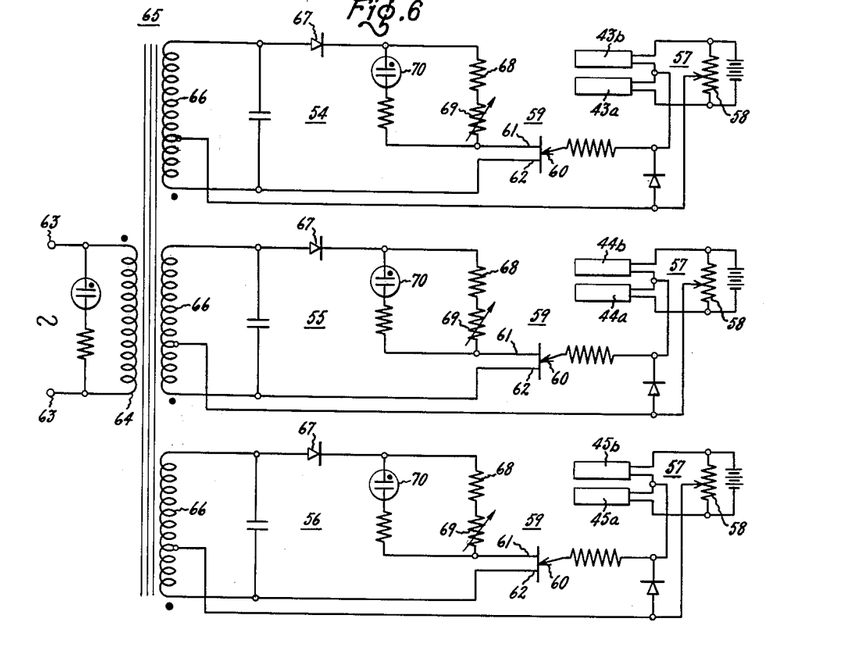
FIGURE 6 is a schematic circuit diagram of an output circuit useful with the transducers of FIGURES 2 and 4.

FIGURE 6 shows a three channel output circuit which may be utilized in conjunction with the transducer of FIGURE 4 to switch the output between a binary zero (0) state and a binary one (1) state whenever the relative magnitudes of the detector resistance is such as to unbalance a bridge sufficiently to produce a slightly positive output voltage. Each detector pair 43a and 43b, 44a and 44b, 45a and 45b, is connected to a separate output channel 54, 55 and 56 through a bridge 57. The detector pairs are connected as two arms of the bridges and a voltage divider 58 as the remaining arms. The output from the bridges 57 is applied by means of suitable leads to three terminal semiconductor switching devices 59 which conduct whenever the detector resistance values are such that the polarity of the voltage at the output terminals at the junction of the detectors becomes positive by a predetemined small increment. That is, whenever the resistances of detectors 43a, 44a, are such that the bridge is unbalanced to produce a positive voltage across its output terminal, this positive voltage is applied to the emitter electrode 60 of the switching elements 59 causing them to become conducting.

The semiconductor switching devices 59 are of the unijunction transistor type and include two ohmic contact base electrodes shown at 61 and 62 and a rectifying emitter electrode 60. Operating voltage for the unijunction transistors is provided by applying a positive biasing voltage across the base electrodes 61 and 62 from a rectified source of alternating voltage. Alternating voltage is supplied from a suitable source to the input terminals 63 of the primary winding 64 of an iron core transformer 65. The transformer 65 has a plurality of secondary windings 66 which are connected in the channels 54, 55 and 56. Rectifying elements 67 connected in series with each secondary winding 64 are so poled that current flows during each positive alternation of the input voltage and providing a pulsating D.C. voltage across resistors 68 and 69 connected in series with the unijuncton transistor 59. An indicating neon glow lamp 70 and a dropping resistance are connected in parallel with the resistors 68 and 69 to complete the circuit.

In operation, during each positive half cycle voltage alternation a positive forward biasing voltage is applied across the base electrodes 61 and 62. In the absence of a positive voltage from the bridges 57, however, the emitter 60 is reverse biased and only a small emitter leakage current flows so that the interbase resistance of the unijunction transistor is very high and most of the voltage drop is across the unijunction transistor 59 and only a small portion across the series resistance combination 68 and 69. As a result, the voltage across the neon glow tubes 70 is insufficient to ionize the gas and the glow tubes are extinguished. Whenever the polarity of the bridge output changes in the positive direction, a positive voltage is applied to the emitter 60 which is sufficient to overcome the reverse biasing and initiating the flow of emitter current. The flow of emitter current produces a negative resistance characteristic in the switch and the interbase resistance of unijunction transistor 59 drops to a very low value so that most of the voltage drop is now across the resistors 68 and 69. This raises the voltage across the neon glow lamps 70 sufficiently to ionize the gas indicating the presence of a binary one (1) pulse condition.

If the light intensities which vary with increases in load, drop below the predetermined value, the output signals from the bridges 57 are again negative raising the resistance of the unijunction transistors and extinguishing neon glow lamps 68 and indicating a binary zero (0) condition. Since the loads at which the individual bridges 57 of the three channels become positive enough to switch the unijunction transistors 58 occur cyclically in the manner indicated by the curves of FIGURE 5, it will be apparent that the individual neon glow tubes 70 in the output channels are energized and de-energized in a predetermined binary sequence with load variations and the particular combination of energized and de-energized glow lamps visually represents the load applied to the stress sensitive member in binary form.

The indicating circuit which has been illustrated and described in connection with FIGURE 6 produces a visual indication of the instantaneous load value in binary form by means of the neon glow lamps 70. It will be apparent however that for some purposes, particularly where the information is to be utilized in a digital computer to carry out certain mathematical computations, it will be necessary to provide the output information in the form of electrical pulses rather than as visual indications. The circuit of FIGURE 6 may be easily modified to accomplish such a result by merely inserting in place of the unijunction transistor switch elements a transistor circuit which is triggered by the appearance of the positive voltage from the bridges to provide an output pulse which may be applied directly to a computer or to a computer storage means. Furthermore, although the circuit of FIGURE 6 is shown as using a pair of detectors in each of the bridges, and is hence particularly useful with the transducer assembly of FIGURE 4, it will be apparent, however, that the circuit arrangement of FIGURE 6 may also be used, with minor circuit modifications, with a transducer assembly of FIGURE 2.

Figure 7:
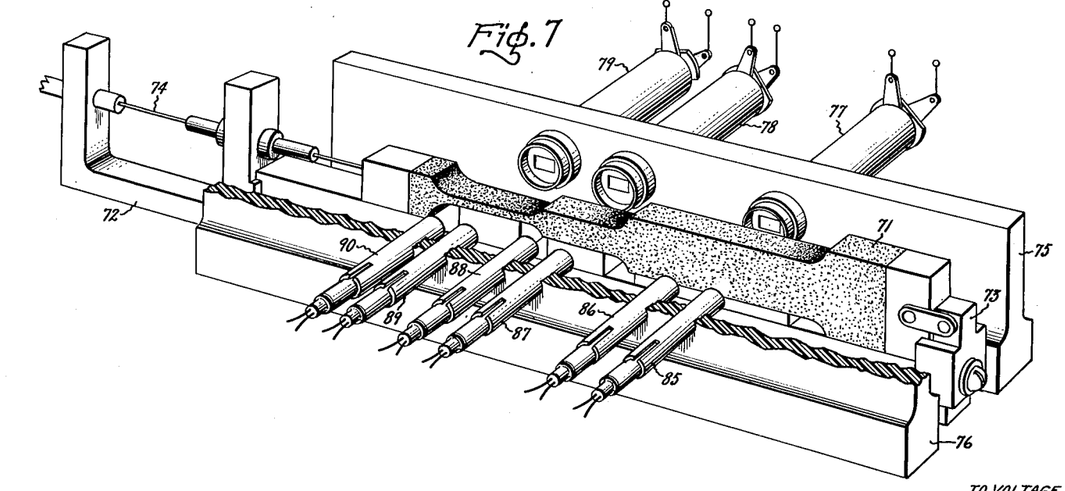
FIGURE 7 is a perspective view of an actual digital transducer constructed in accordance with the invention.
Figure 8:
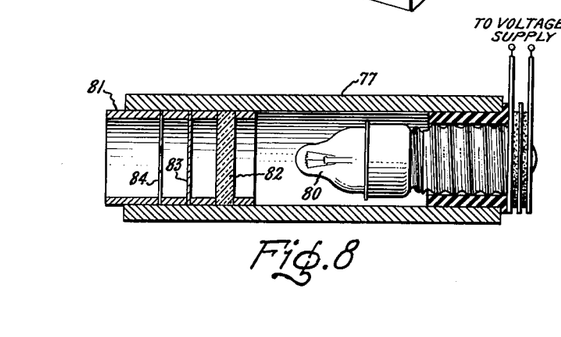
FIGURES 8 and 9 are details of portions of the transducer of FIGURE 7.

FIGURE 7 shows, in perspective, a transducer assembly constructed in accordance with the invention and particularly that embodiment illustrated schematically in FIGURE 4. Thus a stress sensitive member 71 of constant thickness and varying cross-section is mounted in a frame 72 and rigidly supported at one end in a bracket 73 attached to the frame. A tensioning element 74 is fastened to the other end of the member 71 to apply a varying load which produces the phase-retarding stress distribution discussed previously. Supporting members 75 and 76 are positioned at either side of the stress sensitive member and support the beam forming and detecting instrumentalities. A plurality of cylindrical containers 77, 78 and 79 contain the instrumentalities to form and project a narrow beam of monochromatic plane polarized light through the individual sections of the member 71. Each of these containers, as may be seen most clearly in the detailed showing of FIGURE 8, includes an incandescent bulb 80 for producing a beam of white unpolarized light. A rotatable cylindrical member 81 is positioned in the housing and supports a filtering disc 82 for converting the white light from the bulb to monochromatic light. A polarizer element 83 which converts the unpolarized monochromatic light to plane polarized light and a slotted mask 84 are also mounted in the member 81 so that flat beam of plane polarized light is projected onto the stress sensitive member. It is apparent that rotation of the cylindrical member 81 permits manipulation of the plane of polarization of the light beam to provide the desired orientation in space.

Figure 9:
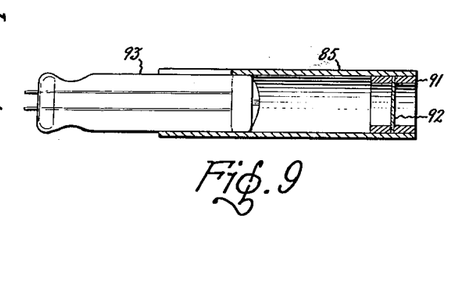

Positioned on the other side of the stress sensitive member 71 and supported in the member 76 are a plurality of containers 85, 86, 87, 88, 89, and 90 which contain the analyzer and detector elements. Each of the members 85, etc., as may be seen most clearly in the detailed showing of FIGURE 9, includes a cylindrical insert 91 which rotatably supports an analyzer element 92 and a photosensitive detector 93. By rotating the cylinder 91 proper orientation of the analyzer principal optical plane may be oriented in the desired manner with respect to the polarizer 83.

In constructing the transducer apparatus illustrated in FIGURE 7 the stress sensitive member 71 was fabricated of polyurethene rubber sold by the Houghton Laboratories of Olean, New York, under their trade name of #8705 Hysol. The polarizer and analyzer elements 83 and 92 were fabricated of a polarizing material sold by the Polaroid Corporation under the trade name Polaroid HN-22. The incandescent lamps 80 and the photoconductive detectors 93 were respectively of the type manufactured and sold by the General Electric Company under their designation GE-243 and Clarex CL-407.

Figure 10:
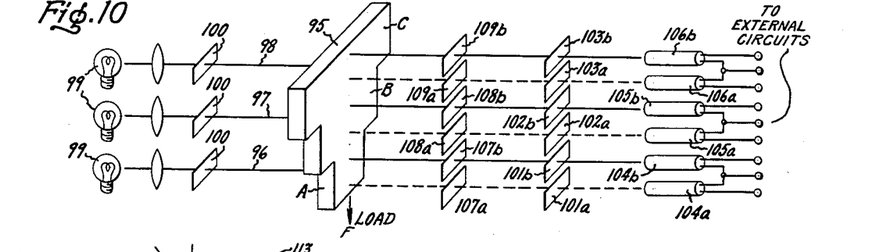
FIGURE 10 is a schematic illustration of a transducer assembly for producing a digital output in the form of a straight binary code.

The various digital transducer arrangements described particularly with reference to FIGURES 2 and 4 produced digitally coded output information in the form of a binary code known as a reflected or Gray code. However, under some circumstances it may be desirable to produce a transducer of type producing output information in terms of a straight binary code. FIGURE 10 illustrates such a construction and includes a stress sensitive member 95 of varying cross-section. A plurality of plane polarized light beams 96, 97 and 98 are projected through sections A, B, and C of the member 95 to rotate the plane of polarization in response to the stress producing load F. Unpolarized white light from a plurality of incandescent light sources 99 is passed through combination filter and polarizing elements 100 to produce beams 96, 97, and 98 of monochromatic plane polarized light. Each of the light beams after passing through the sections A, B, and C are split into two individual beam components which pass through analyzer pairs 101a and 101b, 102a and 102b, 103a and 103b onto individual detectors 104a, 104b, 105a, 105b, 106a and 106b. Each analyzer pair have the principal optical planes oriented in such a manner that one analyzer of each pair is in parallel with the polarizer element while remaining analyzer of each pair is at right angles to the polarizer. As a result the light intensity variations and the detector outputs are 180° out of phase.

Figure 11:
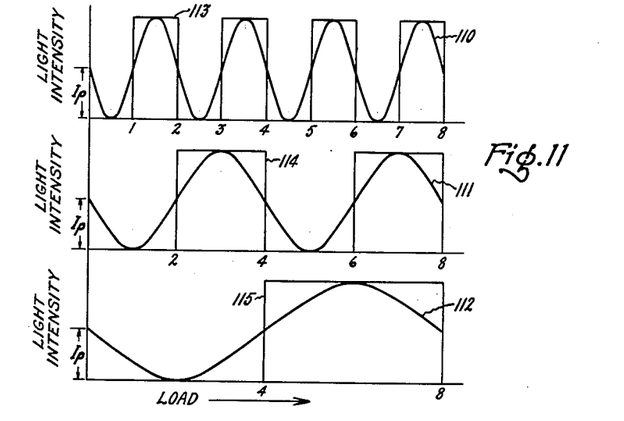
FIGURES 11 and 12 are illustrations of the transmission characteristic curves of the stress sensitive element of FIGURE 10.

A plurality of quarter wave phase retarding plates 107a, 107b, 108a, 108b, 109a and 109b are positioned between the stress sensitive members 95 and the analyzer elements 101–103. These quarter wave plates which may be fabricated of a plate of calcite crystal of predetermined thickness introduce a quarter wavelength phase retardation rotating the plane of polarization of each of the beams by 45°. As a result the light intensity variations with load are phase displaced in a manner shown by curves 110, 111 and 112 of FIGURE 11. It can be seen by inspection that at zero load the light intensity transmitted by the analyzer and illuminating the detectors is at an intermediate value $I_p$ since the rotation of the plane of polarization by the quarter wave plates 107a, 108a, and 109a allows some of the light to pass, whereas in the absence of the quarter wave plates the analyzers would either transmit maximum or minimum light depending on the orientation of the analyzers relative to the polarizers.

Figure 12:
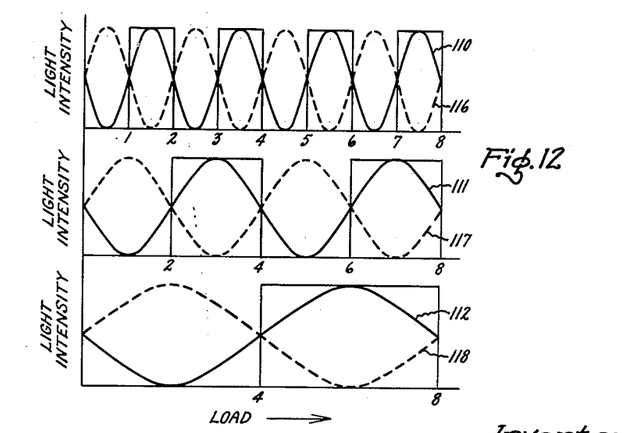

One of the consequences of the displacement of the curves is a corresponding displacement of the binary pulse sequence produced in response to light variations and may be seen most clearly in FIGURE 12. FIGURE 12 shows the light intensity variations of the split beams emerging from the sections A, B, and C with the solid curves 110, 111 and 112 representing light beams passing through analyzers 101a, 102a, and 103a, while the dashed curves 116, 117 and 118 represent the light beams passing through analyzers 101b, 102b, and 103b. If an output pulse 113, 114, and 115 is produced whenever the light intensities are equal and the curves cross in positive going direction and we indicate the condition of each detector and output circuit as the load is increased in per unit steps, the following tabulation is obtained:

| Per unit load | Detector C | Detector B | Detector A |
| --- | --- | --- | --- |
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

Comparing this tabulation of detector states with the digital representation of the same numbers in the straight binary code the following tabulation is obtained:

| Decimal code | Straight binary code | Decimal code | Straight binary code |
| --- | --- | --- | --- |
| 0 | 000 | 4 | 100 |
| 1 | 001 | 5 | 101 |
| 2 | 010 | 6 | 110 |
| 3 | 011 | 7 | 111 |

From comparison of the two tables it can be easily seen that the pulses 113, 114 and 115 appearing at the output of the transducer assembly of FIGURE 10 represent the varying load in a straight binary form.

Hitherto, in describing the novel digital transducers embodying the instant invention, the light path traversed by the plane polarized light beam has been maintained constant and the desired phase retardation and rotation of the plane of polarization has been achieved by producing a stress distribution in the various sections which followed the desired binary relationship, i.e., $1:2:4: \ldots 2^n$. FIGURE 13 shows a transducer which produces a digital output by applying the same stress to all of the sections, but varying the length of the light path traversed by the beam of polarized light in the desired binary relationship. The transducer includes a stress sensitive element 121 comprising a plurality of sections A, B, and C, the thickness of each of the sections being related in the ratio of $1:2:4: \ldots 2^n$, to produce the illustrated step arrangement. Individual plane polarized light beams for each section are produced from incandescent light sources 122, 123 and 124 which project light through filter-polarizing elements 125, 126 and 127 to convert the white light from the incandescent sources into monochromatic plane polarized light. A load F is applied to the stress sensitive member 121 at the center of gravity in order to produce the same stress distribution in sections A, B, and C for a given load. The relative amounts of phase retardation of each of the plane polarized light beams for any given load, therefore, varies as the length of the light path through the sections. Since the length of these paths bear the relationship $1:2:4: \ldots 2^n$, the relative phase retardation of the light beams for a given load has the desired $1:2:4: \ldots 2^n$ relationship. Analyzer elements 128, 129 and 130 are positioned to intercept the light beams emerging from the member 121 and are so oriented that their principal optical planes and axes are at right angles to those of the polarizers and hence do not transmit any light in the absence of a proper amount of stress applied to the member 121. The photosensitive detectors 131, 132, and 133 positioned behind the analyzers intercept the light beams and are connected to a suitable output circuit, such as the one illustrated in FIGURE 6, to produce a pulse output in the manner described previously.

FIGURE 14 shows another embodiment of a digital transducer in which the light beams traversing the individual sections of the stress sensitive member do so a plurality of times by internal reflection to provide an instrumentality of increased sensitivity. FIGURE 14 shows a fragmentary end view of the stair step construction shown in FIGURES 2, 4, 7, etc., in which section A is shown in its entirety and section B is only partially shown. For a given load F applied to the stress sensitive member, plane polarized light beams 142 produced from the incandescent source 143 and the filter-polarizer 144 and passing straight through and out of section A would normally be retarded with load in a manner shown by the curve 145 of the accompanying FIGURE 15. However, by vapor depositing two silvered reflecting surfaces 146 and 147 on opposite sides of section A in partially overlapping relationship, the light beam is internally reflected a number of times emerging and passing through the analyzer member 148 and onto the detector 149.

It will be immediately apparent that in traversing the section a number of times the amount of phase retardation and hence the rotation of the plane of polarization is multiplied by the number of passes of the light beam through the sections A. As a result, the phase retardation for a given section thickness and area and a given load is multiplied by N the number of traverses and the cyclic variation of the light intensity between the levels with load is that shown by the curve 150 in FIGURE 15 where it can be seen that the recurrence rate of the cyclic variations is a multiple of the rate for a direct transmission system. By utilizing reflecting surfaces on both sides of the sections of the stress sensitive member, the sensitivity of the transducer is increased many fold since a much smaller value of load increment will vary the light intensity between the two levels.

Figure 16:
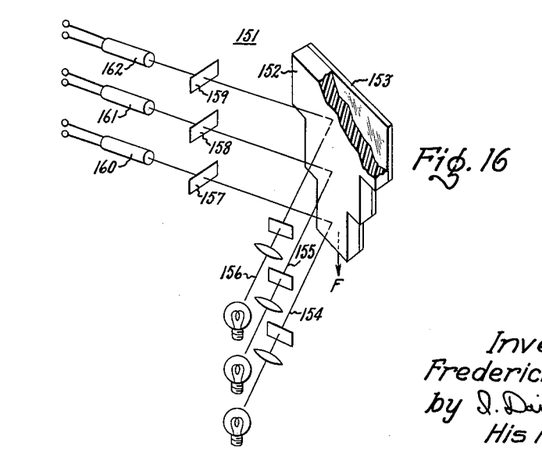
FIGURE 16 is another embodiment of a reflecting type digital transducer system.

In some circumstances, especially where large forces are to be measured, forces which may tend to strain the retarding material beyond its elastic limits, it may be necessary to provide a stress sensitive member construction in which the strain is limited to a value below that of the elastic limit of the material. FIGURE 16 illustrates such a transducer construction. Thus there is provided a stress sensitive element 151 wherein the stress sensitive material 152 is deposited on a light reflecting metallic backing member 153 which does not undergo a large amount of strain even under substantial loads, so that the stress sensitive material 152 is never strained beyond its elastic limit. Polarized light beams 154, 155, and 156 are projected through the stress sensitive material and reflected from the metallic backing element 153 through the analyzer elements 157, 158, and 159 onto detectors 160, 161, and 162 to produce binary output pulses in the customary fashion. In this manner a digital transducer assembly capable of measuring very large ranges of forces is made available.

Figure 17:
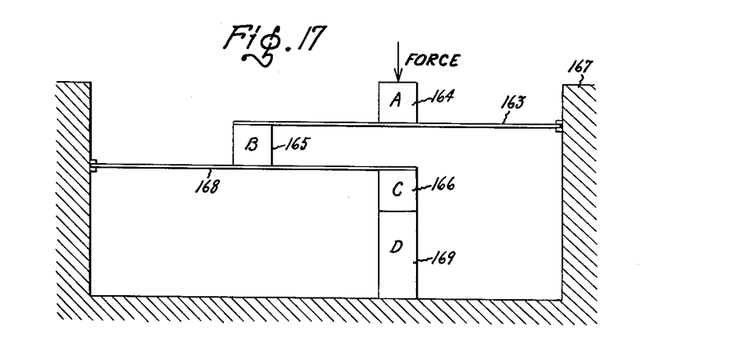
FIGURE 17 is a schematic illustration of a mechanical stress distribution system.

FIGURE 17 illustrates still another construction of a stress sensitive element which may be utilized in digital transducers. In the apparatus of FIGURE 17 a plurality of stress sensitive elements 164, 165 and 166 of the same thickness and cross-section are provided, and a mechanical linkage distributes the stress between the elements in a manner designed to produce the desired digital output. The mechanical linkage is so constructed that the stress sensitive member 164 is mounted on a rigid arm 163 which is pivoted at one end attached to a frame 167. Stress sensitive member 164 is positioned at the midpoint of the arm 163 and has a load F applied directly thereto. The free end of the arm 163 is supported by the second stress sensitive member 165 so that this member is subjected to a load of $$\frac{F}{2}$$

The member 165 is in turn positioned on the midpoint of a second rigid arm 168 which is attached to and pivots about a point on the frame 167. The free end of the arm 168 acts on the third stress sensitive member 166 which is supported on a block 169 attached rigidly to the frame 167 and is subject to one half of the load acting on member 165, or $$\frac{F}{4}$$

It can be seen upon inspection that each of the stress sensitive members is acted upon by one half of the force acting on the preceding member because of the action of the mechanical linkage.

Since the cross-sectional areas and the thickness of the stress members are equal this stress distribution in the respective members follows the predetermined binary relationship $1:2:4: \ldots 2^n$ and beams of plane polarized light transmitted through the sections produce a light intensity varying cyclically between two levels in the same manner as the transducer assemblies discussed previously. It can be seen that the load distribution system of FIGURE 17 may under some circumstances be very advantageous in that the overall size of the stress sensitive member may be reduced. Furthermore, since the individual sections are the same the fabrication and manufacturing procedure is greatly simplified. It will also be apparent that stress distribution in the elements can be adjusted by varying the length of the pivot arm acting on them so that coded outputs other than the binary may be produced.

The various constructions of a digital transducer embodying the invention which have hitherto been described have all included mechanical stress sensitive members. However, the term stress as utilized in the instant specification is not limited to mechanical stresses, but also encompasses electrical and magnetic stresses. Certain substances which are normally optically isotropic become temporarily doubly refracting when subjected to an electric field, and plane polarized light having components both parallel and perpendicular to the applied electric field will travel at different velocities traversing the substances and have the plane of light polarization rotated. Fluids which exhibit this characteristic effect, known to those skilled in the art as the Kerr effect, after the first observer of this phenomenon, will produce a phase retardation the magnitude of which is defined in the following equation:

$$\tau = 2K1E^2$$

where $\tau$ = the time phase difference angle in radians between the polarized light components
$K$ = the Kerr constant of the substance
$1$ = the path under the influence of the electric field (cm.), and
$E$ = the electric field (c.g.s. units)

Examples of such fluids exhibiting the Kerr effect are shown in the following tabulation and may be utilized in a digital transducer to be presently described:

| Substance | Kerr constant |
| --- | --- |
| Carbon disulphide, $CS_2$ | $3.6 \times 10^{-7}$ |
| Chloroform, $CHCl_3$ | $-3.2 \times 10^{-7}$ |
| Acetone, $C_3H_6O$ | $16 \times 10^{-7}$ |
| Nitrobenzene, $C_6H_5NO_2$ | $400 \times 10^{-7}$ |

Figure 18:
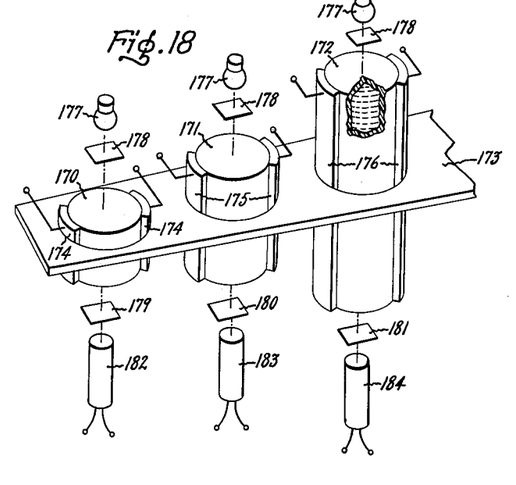
FIGURES 18 and 19 are digital transducer assemblies in which electrical stresses produce the desired polarization rotation.

In the transducer assembly shown in FIGURE 18 three light transparent, non-conducting sealed vessels 170, 171 and 172 are supported in a bracket 173 and contain a fluid such as nitrobenzene which exhibits the Kerr effect. The containers 170, 171 and 172 are of different length so that the length of the light path through the fluid is related in the ratio of $1:2:4: \ldots 2^n$. It will be immediately apparent from the above equation that for a given fluid and a given applied voltage E the phase retardation of a beam of plane polarized light passing through the individual cell members will vary in the desired binary relationship.

Each of the members 170, 171 and 172 has a pair of axially extending electrodes 174, 175 and 176 which apply an electric field across one diameter of the cylinder in response to an input voltage. If a monochromatic plane polarized light beam whose plane of polarization is oriented at 45° to the applied electric field is transmitted through the fluid the components thereof which are respectively parallel and perpendicular to the applied electric field are transmitted through the fluid at different velocities introducing a phase retardation effect in each of the cells which varies in the desired binary relationship for a given applied voltage E. To this end, a plurality of plane polarized beams having the desired orientation to be applied to the electric field are provided by the incandescent light sources 177 and their associated filter polarizer elements 178. As described previously the principal planes and optical axes of the polarizers are so positioned in space that the plane of polarization of the plane polarized light bears the desired relationship to the applied electric field.

A plurality of individual analyzer elements 179, 180 and 181 are positioned to intercept the polarized beams and have their principal optical planes so positioned that no light is transmitted to their associated detectors 182, 183 and 184 in the absence of an electric field. As voltage is applied simultaneously to the electrodes 174, 175 and 176 of the individual cells a phase rotation proportional to the electric field is produced, the magnitude of which varies in the desired relationship for the individual beams to produce a binary output from the detectors. Thus a digital transducer has been provided which produces output information in digital form from an electrical input parameter.

Figure 19:
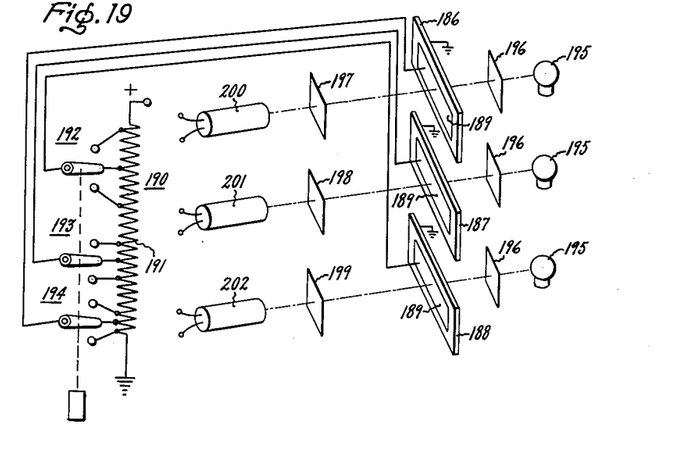

Certain crystalline materials, of which crystalline $NH_4H_2PO_4$ is commercially available under the designation PN is an example grown and sold by the Brush Development Company, Cleveland, Ohio, also exhibits the characteristic of temporary double refraction when subjected to the action of an electric field. FIGURE 19 illustrates a structure for producing a digital transducer utilizing a crystalline material in place of the fluids illustrated in FIGURE 18. Such crystalline materials exhibit strong phase retardation effects when the field is applied parallel to the direction of light propagation and at the same time parallel to the optical axis. The retardation effect is linear with field strength and since the light path and field strength are in the same direction the effect becomes linear with voltage and substantially independent of thickness.

In the structure illustrated in FIGURE 19, a plurality of such crystalline elements 186, 187 and 188 have associated therewith a pair of transparent electrodes 189, only one of which is shown, for applying the electric field. The electrodes may be formed, for example, of glass coated with a stannic-oxide film and are connected to opposite faces of each of the crystals. One electrode in each pair is connected to ground potential whereas the other electrodes are connected through suitable leads to a voltage controlling device shown generally at 190. The voltage controlling device 190 consists of a potentiometer element 191 one end of which is grounded and the other end of which is connected to a source of voltage to be measured. The potentiometer 191 includes ganged stepping switches 192, 193 and 194 each of which includes a plurality of spaced taps and a wiper contact moving under manual or automatic control. The individual stepping assemblies 192, 193 and 194 are so positioned along the potentiometer 191 that corresponding taps thereon are spaced so that the voltages applied to the respective crystals are always in the ratio of $1:2:4:\ldots 2^n$, i.e., the binary relationship. Consequently, the amount of phase retardation produced by the individual crystals on a beam of monochromatic plane polarized light is always such as to produce an output having a binary characteristic.

A plurality of plane polarized light beams for the crystals is provided by the incandescent light sources 195 and their associated filter-polarizers 196. The crystal elements under the influence of the applied electric fields introduce a phase retardation and rotate the plane of polarization of the light beams to vary the light intensities passing through analyzer elements 197, 198 and 199 onto their associated detectors 200, 201, and 202 cyclically between two levels. As the voltages applied to the crystal doubly refracting elements varies, either by varying the position of the wiper contact elements or by varying the voltage applied to the potentiometer 191, a digital output is produced directly from a varying electrical analog input parameter.

It will be understood, of course, that other crystals may be substituted for the $NH_4H_2PO_4$ without going outside of the scope of the invention. That is, such other phosphates as ammonium dihydrogen phosphate (ADP), potassium dihydrogen phosphate (KDP), as well as rubidium dihydrogen phosphate also exhibit the temporary double refraction phenomenon under applied electric field. In addition, various other crystalline substances may als obe used including, among others, calcium dichromate, tartaric acid, magnesim sulfate, hydrated zinc sulfate, etc. The various crystalline substances which have been listed above as being applicable to the invention are by way of example only and are not to be considered as limiting the invention to those specific substances.

While a particular embodiment of this invention has been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. In a digital transducer assembly the combination comprising a stress sensitive member of varying transmission characteristics to modify a beam of radiant energy to produce a cyclically varying output in response to a varying analogue input parameter, means to apply said varying analogue input to said stress sensitive member in such a manner that different portions thereof modify said radiant energy with increasing input at cyclically recurring rates related in a predetermined coded fashion, and means to receive the various cyclically modified radiant energies and produce a digital indication for each alternation.

2. In a digital transducer the combination of stress sensitive light modifying means of varying transmission characteristics positioned in a field of plane polarized light to vary the polarization of the light under load, means to apply a load to said modifying means to produce varying stress distribution in selected portions thereof to change the wave transmission characteristics and the polarization of the light whereby said light undergoes cyclic intensity variations of different frequencies with linearly increasing load, and means to convert the alternations of each of the cyclic light intensity variations into digital output information.

3. In a digital transducer the combination comprising light modifying means positioned in a field of plane polarized light for cyclically varying the intensity of said light simultaneously at a plurality of frequencies in response to a varying input, said last named means including a stress responsive member for producing a light phase retardation varying linearly with stress, said member having a configuration such that the stresses in various portions thereof bear a predetermined relationship, means to apply a load to said member to produce proportional phase retardations in the various portions of said member whereby the light passing through said portions undergoes cyclic intensity variations with linearly increasing load at frequencies bearing said predetermined relationship, and means to receive said light and simultaneously convert the alternations of each of the cyclic intensity variations into digital form.

4. In a digital transducer the combination comprising means to produce a plurality of polarized light beams, means to modify said light beams as a function of load to produce cyclic intensity alternations of different periodicities, said means including a stress sensitive member comprising a plurality of elements of different cross-sections, said elements being positioned in the path of the individual beams and capable of producing phase retardations of the light beams which vary cyclically with stress in the portions, means to apply a load to said stress sensitive member to change the phase retardation characteristics of said elements whereby the intensities of the light beams passing through said elements vary cyclically at recurrence rates related to the ratio of cross-sections of said elements, and means to produce electrical output signals from each of said beams in synchronism with the intensity alternations.

5. In a digital transducer the combination comprising means to produce a plurality of polarized light beams, means to modify said light beams to change the plane of polarization of the light beams as a function of stress therein, said last named means including a stress sensitive member having a plurality of sections of different cross-section traversed by said light beams, means to apply a varying load serially to said member to distribute the stress in said section in accordance with the ratio of their cross-sections whereby the light intensities of said beams vary cyclically between said levels with varying loads at frequencies related in the same ratio as the cross-sections, and means to receive said beams and convert the intensity alternations of each beam into digital form.

6. In a digital transducer the combination comprising a stress sensitive temporary doubly refracting member having wave retarding characteristics which vary linearly with stress for changing the plane of polarization of an incident light beam, said member having a plurality of sections in areas of which bear a binary relationship, means to produce a plurality of polarized light beams adapted to traverse said sections, means to subject said member to a load and produce a binary stress distribution in said sections to change the planes of polarization of the light beams whereby said light beams undergo cyclic intensity variations with increasing load at frequencies related in accordance with the binary relationship, and means to receive said beams to produce outputs in digital form from each of said beams in response to changes in intensity between said levels for each cycle.

7. In a digital transducer the combination comprising a light modifying member having a stepped configuration to provide a plurality of sections the areas of which bear the relationship $1:2:4: \ldots 2^n$, said member being capable of having its wave transmission characteristic varied by application of stress thereto, means to project plane polarized light beams through the individual sections of said member, means to apply a load to said member to vary the wave transmission characteristics thereof and shift the phase of the light beams by amounts which vary inversely as the relationship of the areas whereby the light intensities of the beams vary cyclically with load between two levels at frequencies bearing said $$1/1 : 1/2 : 1/4 : \ldots 1/2^n$$

relationship, and means to produce digital outputs in response to said beams only in response to changes between said intensity levels.

8. In a digital transducer the combination comprising means to produce a field of plane polarized light including output polarizing means to control the intensity of the transmitted light output, a stress responsive temporary doubly refracting member positioned in said field to change its wave transmission characteristics in response to applied load to vary the output from said polarizing means, the geometry of the stress responsive member being such that a plurality of predetermined discrete stress relationships are produced within different portions of said member with applied load, means to apply a load to said member to change the polarization and vary the intensity of the light transmitted by said polarizing means cyclically between two levels with varying load, the frequency of the cyclic light intensity variations of the plane polarized light passing through said portions correspond to the discrete stress relationships in said portions, and means to produce discrete outputs from the polarized light whenever the intensities change level.

9. In a transducer apparatus for producing a parallel binary coded output in response to an analogue input parameter, the combination comprising a plurality of stress responsive temporary doubly refracting members, means to project plane polarized light simultaneously through said members, means to apply a load simultaneously to said members and distribute the stress therein in predetermined proportions to vary the intensity of light transmitted through the members cyclically with load so that the frequencies of the cyclic light intensity variations vary inversely as the stress distribution in the members, and means to produce individual discrete outputs in response to the varying intensity of light passing through each of the said plurality of members.

10. In a digital transducer apparatus for producing an output in binary coded form from an analogue input parameter the combination including a stress sensitive temporary doubly refracting member for varying the plane of polarization of incident light comprising a plurality of sections the areas of which are related in the ratio $1:2:4:8: \ldots 2^n$, means for producing a field of plane polarized light to be acted upon by said stress sensitive member including crossed polarizer pairs associated with each of said sections, means to apply a load to said member to vary the transmission characteristics and change the polarization of the said light whereby each of the polarizer pairs transmits light the intensity of which varies cyclically between two levels with load and 180° out of phase, the frequencies of the cyclic light intensity variations associated with each section are related in the ratio $1/1 : 1/2 : 1/4 : \ldots 1/2^n$, and means to produce simultaneously discrete outputs in response to the light from each section for each alternation in the cycle between the levels, including bridge means to produce said output whenever the out-of-phase light components from each section have a predetermined relationship.

11. The digital transducer of claim 10 including means associated with each of said polarizer pairs to produce a fixed amount of wave retardation of the light from said sections whereby a digitally coded output in the form of a straight binary code is produced.

12. In a digital transducer the combination including a stress sensitive temporary doubly refracting means to vary the polarization of incident light in response to applied load comprising a plurality of members of equal area, means to produce a field of plane polarized light arranged to pass through said members and adapted to be acted upon by said members, means to apply a load to said members to vary the transmission characteristics thereof to vary the polarization of said light including a mechanical linkage actuated by said load to distribute the load among said members in a predetermined ratio whereby the intensity of the light passing through said members varies cyclically with load at repetition frequencies related to the load distribution ratio, and means to produce individual discrete outputs in response to the varying intensity of the light passing through the plurality of members.

13. In a digital transducer the combination comprising means to produce a field of plane polarized light including polarizing means the transmission areas of which are oriented in a predetermined manner with the plane of polarization of said light, means to intercept the light transmitted by said polarizing means to produce an output in response to the intensities of the intercepted light, stress sensitive means positioned in said field to vary the polarization and the intensity of the light falling on said detecting means cyclically with load, said stress sensitive means comprising a plurality of sections, reflecting means positioned on the faces of said sections to cause said light to traverse a section a predetermined number of times before emerging therefrom, means to load said stress sensitive means to vary the wave retarding characteristics in a predetermined relationship so that the light is retarded a fixed amount during each of the multiple traverses through the sections.

14. In a digital transducer, means to produce a field of plane polarized light, stress sensitive temporary doubly refracting member positioned in said field to vary the plane of polarization in response to applied load, said member having a plurality of sections presenting light paths to said polarized light related in a predetermined coded relation, means to intercept light emerging from said sections to produce digital outputs in response to cyclic intensity variations of said light resulting from changes in polarization of said light, and means to load said members to stress said sections equally and change the polarization cyclically with load at a repetition frequency determined by the relationship light paths.

15. In a digital transducer the combination comprising means to produce a field of plane polarized light, a temporary doubly refracting member positioned in said field to change the plane of polarization of said light in response to an electrical stress, means to apply an electrical signal to said member to produce electrical stresses in said means which bear a predetermined relationship to retard the light and produce cyclically varying light intensities, the frequencies of the cyclic variations corresponding to the electrical stress relationships established in said means, and means to produce digital outputs in response to each alternation of the light intensity cycles.

16. In a digital transducer the combination comprising means to produce a field of plane polarized light, a temporary doubly refracting means positioned in said field to change the plane of polarization of the light in response to an electrical stress including a plurality of members for simultaneously affecting the polarization at different cyclic rates, each of said members comprising at least one Kerr cell for introducing a phase retardation of the light which varies with stress resulting in a change in the plane of polarization, each of said members with said Kerr cell having a wave retardation effect which is related to the remaining ones in a predetermined manner, means to apply a voltage to said members to produce electrical stresses and retard the light passing through said members effectively in said predetermined relation for all conditions to produce in response to change in polarization cyclically varying light intensities the repetition frequencies of which follow said predetermined relation, and means to produce discrete outputs in response to each alternation of the light intensity cycle of light transmitted through each of said members with said Kerr cell.

17. The digital transducer of claim 16 in which said members having said Kerr cell are constructed to present light paths of different lengths to said plane polarized light, the lengths of the light paths being related in a predetermined manner corresponding to the desired stress distribution and the frequency of light intensity alternations.

18. In a digital transducer the combination comprising means to produce a field of plane polarized light, a temporary doubly refracting means positioned in said field adapted to change its wave retardation characteristics and change the plane of polarization of incident light in response to an applied electrical stress including a plurality of members for simultaneously changing the polarization of different portions of the light field at different cyclic rates, each of said members including at least one stress sensitive wave retarding crystal, electrical means connected to each of said crystals to apply related voltages thereto so that the electrical stresses on the crystals are in the same proportions for all applied voltages, the relative proportions of the applied stresses following a binary relationship whereby the light passing through the crystals varies cyclically with increasing applied voltage and repetition frequency of said cyclic variations bearing the same binary relationship as do the applied stresses, and means to produce discrete outputs in response to each alternation in intensity for the light transmitted by each of said crystals.

19. A transducer assembly for directly converting an analogue stress representative of a condition desired to be measured to a digital form output electric signal comprising a stress sensitive radiant energy modifying means which may be stressed to temporarily modify the characteristics of radiant energy impinging thereon, means to apply the stress to be measured to said stress sensitive means, means for directing incident radiant energy onto said stress sensitive means whereby the incident radiant energy is either modified or allowed to emanate from said stress sensitive member in an unmodified form as determined by the stress applied to said means, and radiant energy sensitive electric signal generating means for converting the modified-unmodified radiant energy signals emitting from said stress sensitive means into a digital form output signal representative of the stress applied to said stress sensitive means.

References Cited in the file of this patent

UNITED STATES PATENTS

| | | |
|---|---|---|
| 1,629,337 | Garrett | May 17, 1927 |
| 2,174,269 | Land | Sept. 26, 1939 |
| 2,423,304 | Fitch | July 1, 1947 |
| 2,829,555 | Keston | Apr. 8, 1958 |
| 2,855,539 | Hoover | Oct. 7, 1958 |